United States Patent [19]

Naoi et al.

[11] Patent Number: 5,159,850

[45] Date of Patent: Nov. 3, 1992

[54] PARKING-BRAKE OPERATING DEVICE

[75] Inventors: Yasushi Naoi, Kawasaki; Kenichi Kobayashi, Yokohama; Harutoshi Ota, Ueda; Yasushi Kuribayashi, Ueda, all of Japan

[73] Assignees: Mitsubishi Jidosha Kogyo Kabushiki Kaisha, Tokyo; Johan Seisakusho Co., Ltd., Ueda, both of Japan

[21] Appl. No.: 594,920

[22] Filed: Oct. 10, 1990

[30] Foreign Application Priority Data

Apr. 14, 1989 [JP] Japan ................. 1-93227

[51] Int. Cl.⁵ .................. G05G 5/18; G05G 7/04
[52] U.S. Cl. ...................... 74/523; 74/575; 74/577 M
[58] Field of Search ............ 74/523, 575, 577 M

[56] References Cited

U.S. PATENT DOCUMENTS 4,881,424  11/1989  Clark et al. .................. 74/523

FOREIGN PATENT DOCUMENTS 2645982  4/1978  Fed. Rep. of Germany ........ 74/523
2-53657  2/1990  Japan ........................ 74/523
2196416  4/1988  United Kingdom ............... 74/523

*Primary Examiner*—Rodney H. Bonck
*Assistant Examiner*—Ryan W. Massey
*Attorney, Agent, or Firm*—Lowe, Price, LeBlanc & Becker

[57] ABSTRACT

A parking-brake operating device comprises a braking-force holding mechanism including a plate-like bracket having a ratchet wheel and mounted at a location adjacent a seat on a body floor, a swing arm mounted to the bracket for angular movement, and a ratchet pawl supported on the swing arm for angular movement and engageable with and disengageable from the ratchet wheel so as to hold the swing arm onto the bracket; an operating lever supported by the bracket coaxially with the swing arm and for angular movement, and having at least one opening; a support shaft mounted on the swing arm and loosely fitted in the opening so as to permit a predetermined quantity of relative movement between the swing arm and the operating lever; a link mechanism including a bell crank supported on the operating lever for angular movement, and a link element having its both ends which are connected respectively to one end of the bell crank and the ratchet pawl for angular movement; a release element mounted to the operating lever, the release element having one end thereof connected to a release knob projecting from the operating lever, the other end of the release element being connected to the other end of the bell crank; and a cable mounting element having one end thereof connected to the support shaft, and the other end connected to the brake operating device through a control cable.

9 Claims, 3 Drawing Sheets

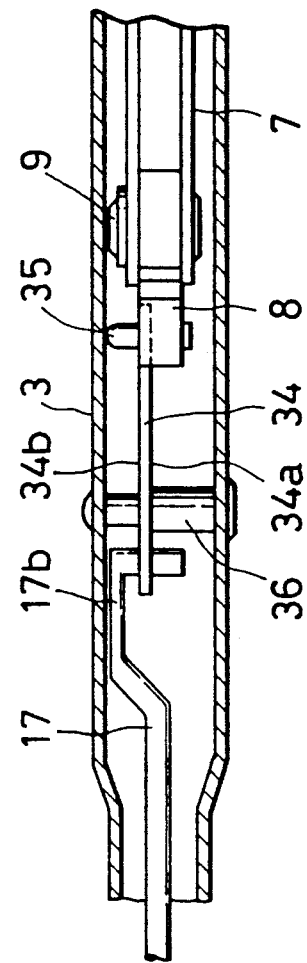
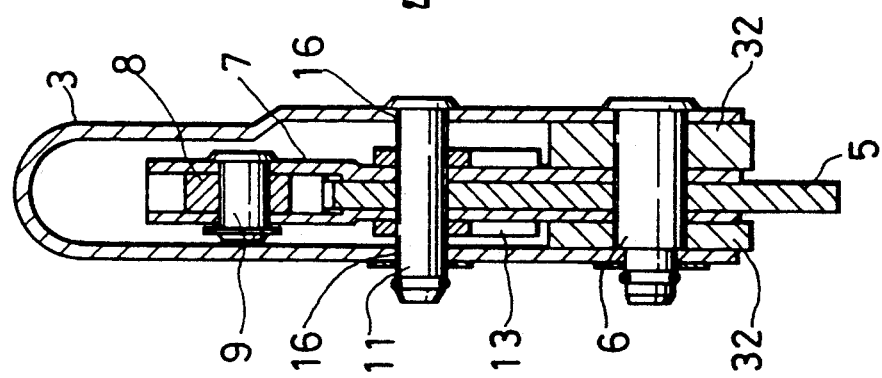

PARKING-BRAKE OPERATING DEVICE

BACKGROUND OF THE INVENTION

1. Field of the Invention

The present invention relates to a parking-brake operating device.

2. Description of the Prior Art

The conventional parking-brake operating device is arranged such that an operating lever having a control cable directly connected thereto is moved to apply a braking force to a brake. Under this condition, the operating lever is fixed to hold the braking force of the brake. Further, it is common that the fixing of the operating lever is practiced by engagement of a ratchet pawl provided on the operating lever to a ratchet of a bracket provided on the side of a body of an automotive vehicle. A braking-force holding mechanism for holding the braking force of the brake is composed of the operating lever, the ratchet wheel and a ratchet pawl on the side of the body of the automotive vehicle. The operating lever is provided with a release element such as a release rod or the like for disengaging the ratchet pawl and the ratchet wheel from each other to release fixing of the operating lever, thereby releasing the brake.

The conventional parking-brake operating device has the disadvantage that, when the brake is operated the operating lever is always in a full-cock position, so that the projecting operating lever prevents getting-in and getting-out of a driver, and a space within the vehicle is reduced or narrowed.

SUMMARY OF THE INVENTION

It is an object of the invention to provide a parking-brake operating device in which brake operation is practiced by an operating lever, a braking force of a brake is held by a braking-force holding mechanism and, subsequently, the operating lever is returned by a predetermined amount permitted between a swing arm of the braking-force holding mechanism and the operating lever, whereby, even under the condition that the brake is operated, the operating lever does not unnecessarily project from a driver's seat or the like, thus, such disadvantages can be avoided that the getting-in and getting-out of the driver is prevented by the operating lever, and the space within the vehicle is made small, and in which it can be avoided that the operating lever returned from practicing of the brake operation is inadvertently returned to an original position of the brake release over or beyond a permitted predetermined amount, and it is possible to easily confirm the operating condition of the brake.

In order to achieve the above-described object, a parking-brake operating device according to the invention comprises: a braking-force holding mechanism including a plate-like bracket having a ratchet wheel and mounted at a location adjacent a seat on a body floor, a swing arm mounted to the bracket for angular movement, and a ratchet pawl supported on the swing arm for angular movement and engageable with and disengageable from the ratchet wheel so as to hold the swing arm on to the bracket; an operating lever supported by the bracket coaxially with the swing arm and for angular movement, and having at least one opening; a support shaft mounted on the swing arm and loosely fitted in the opening so as to permit a predetermined quantity of relative movement between the swing arm and the operating lever; a link mechanism including a bell crank supported on the operating lever for angular movement, and a link element having its both ends which are connected respectively to one end of the bell crank and the ratchet pawl for angular movement; a release element mounted to the operating lever, the release element having one end thereof connected to a release knob projecting from the operating lever, the other end of the release element being connected to the other end of the bell crank; and a cable mounting element having one end thereof connected to the support shaft another end connected to a brake operating device through a control cable.

When the operating lever is raised up from the condition of the brake release, the support shaft provided on the swing arm and loosely fitted in the opening in the operating lever is abutted against one side of the opening in the operating lever, so that the operating lever, the support shaft and the swing arm are angularly moved together. The cable mounting element connected to the support shaft draws or tensions the control cable to operate the brake operating device. Thus, the brake is operated.

The ratchet pawl supported by the swing arm for angular movement is engaged with the ratchet wheel of the bracket to hold the swing arm onto the bracket. Thus, the support shaft mounted to the swing arm is prevented from being returned, to maintain the braking force of the brake.

When the operating lever is moved relative to the swing arm from the condition that the support shaft is abutted against the one side of the opening in the operating lever, to the condition that the support shaft is abutted against the other side of the opening in the operating lever, it is possible to avoid unnecessary projection of the operating lever.

The release knob is pushed to rotate the lever element by the other end of the release element, and the ratchet pawl is moved angularly by the link element connected to the other end of the lever element to disengage the ratchet pawl and the ratchet wheel from each other. Thus, the swing arm is returned to its original position, so that the braking of the brake is released.

BRIEF DESCRIPTION OF THE DRAWINGS

FIG. 3 is a cross-sectional view taken along the line A—A in FIG. 1; and

FIG. 4 is a cross-sectional view taken along the line B—B in FIG. 1.

DETAILED DESCRIPTION OF THE PREFERRED EMBODIMENT

Figure 1:
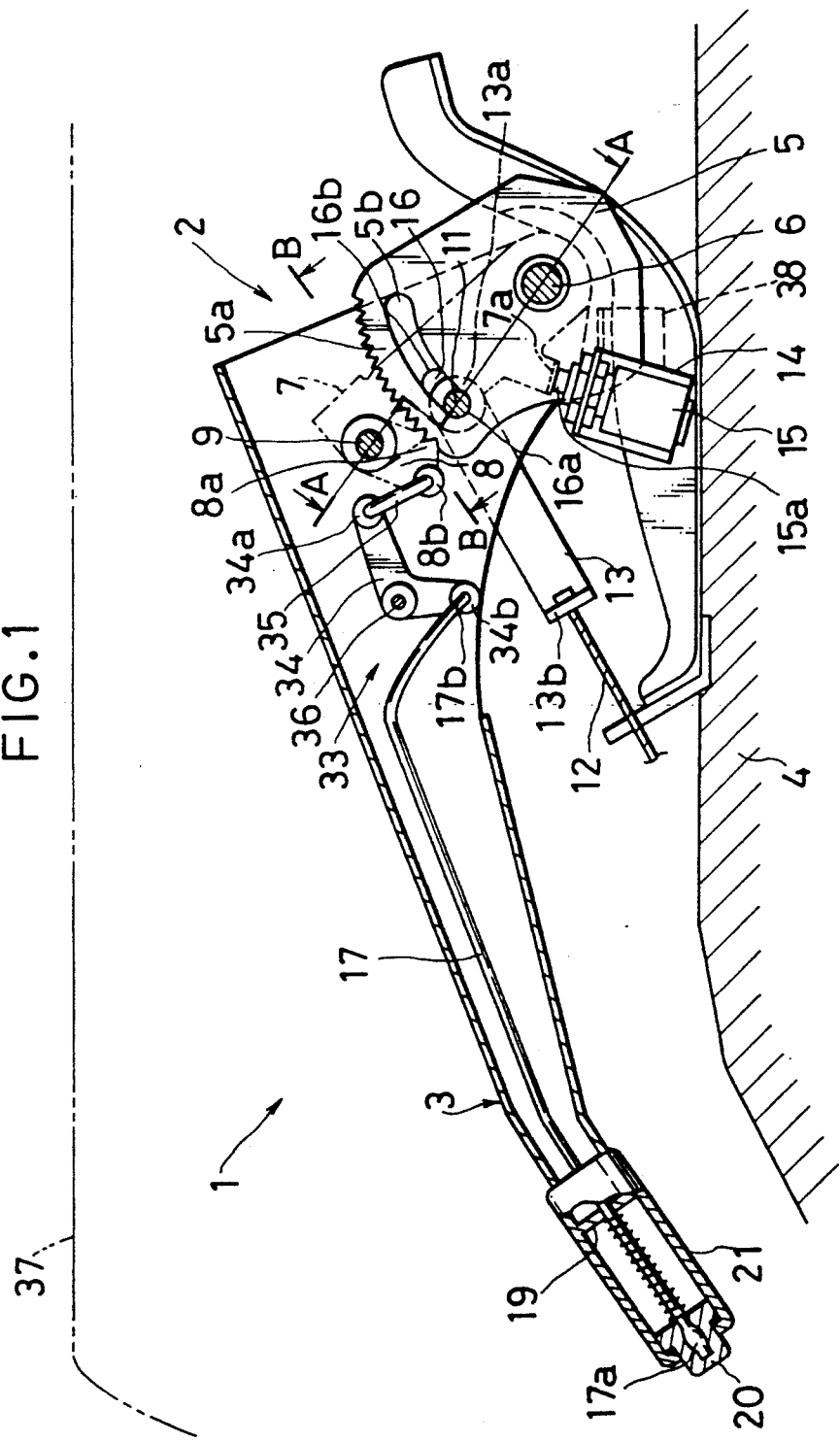
FIG. 1 is a cross-sectional side elevational view of a parking-brake operating device according to a preferred embodiment of the invention, with a brake released.

In a preferred embodiment of this invention, the parking-brake operating device 1 comprises a braking-force holding mechanism 2, an operating lever 3, a link mechanism 33, a release element 17 and a cable mounting element 13.

The braking-force holding mechanism 2 is provided so as to be upstanding at a location adjacent a seat on a center floor 4 of a body, and is composed of a plate-like bracket 5 formed, at its forward end, with a ratchet wheel 5a, a swing arm 7 supported on the bracket 5 through an angularly movable shaft 6 for angular movement, and a ratchet pawl 8 supported on the swing arm 7 through an angularly movable shaft 9 for angular movement and engageable with and disengageable from the ratchet wheel 5a so as to hold the swing arm 7 onto the bracket 5. An urging section, which is composed of a turning-back piece 7a formed such that a part of the swing arm 7 is folded or bent substantially perpendicularly, urges or pushes an actuator 15a of a brake detection switch 15 fixedly mounted to the bracket 5 through a support piece 14, at a location where the brake is released as illustrated in FIG. 1.

The operating lever 3, which is supported on the bracket 5 through the angularly movable shaft 6 coaxially with the swing arm 7 and for angular movement separately, has a proximal portion whose both sides are provided respectively with a pair of elongated openings 16 which extend along the angular movement direction of the operating lever 3 and which are eccentric with the angularly movable shaft 6, as shown in FIGS. 1 and 3. A support shaft 11 extending through the swing arm 7 is loosely fitted in the elongated openings 16.

On the basis of the relationship between the support shaft 11 provided on the swing arm 7 and the openings 16 provided in the operating lever 3, a predetermined quantity of relative rotational movement is permitted or allowed between the swing arm 7 and the operating lever 3. Under the brake-releasing condition as illustrated in FIG. 1, one sides 16a of the respective openings 16 are abutted against the left-hand side of the support shaft 11.

The bracket 5 is provided with an opening 5b eccentric with the angularly movable shaft 6, and the support shaft 11 extends through the opening 5b.

A pair of large-diameter spacers 32 shown in FIG. 3 are fitted about the angularly movable shaft 6 supporting the swing arm 7 and the operating lever 3 for angular movement relative to the bracket 5, at their respective locations between the outside of the swing arm 7 and the inside of the operating lever 3. The spacers 32 reduce frictional resistance between the swing arm 7 and the operating lever 3, to prevent the swing arm 7 and the operating lever 3 from being displaced relatively to the bracket 5.

The link mechanism 33 is composed of a bell crank 34 supported for angular movement on an angularly movable shaft 36 mounted to the operating lever 3, and a link element 35 whose both ends are supported respectively by one end 34a of the bell crank 34 and an end 8b of the ratchet pawl 8 for angular movement.

The rod-like release element 17, which is mounted within the operating lever 3, has one end 17a which is fixedly mounted to a release knob 20 projecting from the forward end of the operating lever 3. The other end 17b of the release element 17 is connected to the other end 34b of the bell crank 34 for angular movement.

The release element 17 is supported for sliding movement in the longitudinal direction of the operating lever 3 by the release knob 20 fitted in the forward end of the operating lever 3 and a support piece 19 provided within the forward end of the operating lever 3. The release element 17 is biased toward the left in FIG. 1 under elasticity of a coil spring 21 interposed between the release knob 20 and the support piece 19. By the biasing, the bell crank 34, to which the other end 17b of the release element 17 is connected, is so biased as to be rotated in the clockwise direction in FIG. 1 about the angularly movable shaft 36. The link element 35, whose one end is supported by the one end 34a of the bell crank 34 for angular movement, is so biased as to rotate the ratchet pawl 8 supported on the angularly movable shaft 9, in the counterclockwise direction in FIG. 1. A meshing portion 8a of the ratchet pawl 8 is urged against the ratchet wheel 5a of the bracket 5.

As shown in FIG. 4, the bell crank 34 is supported on a smaller-diameter section of the stepped angularly movable shaft 36 which extends through both sides of the operating lever 3 so as to be fixedly mounted thereto. The one side 34a of the bell crank 34 is axially positioned by an end face of a larger-diameter section of the shaft 36. The other end 17b of the release element 17 and the one end of the link element 35 supported respectively at both ends of the bell crank 34 for angular movement have their respective forward ends which are bent or folded substantially perpendicularly. These bent ends are inserted through the bell crank 34 from the other side 34b thereof. The release element 17 and the link element 35 are so held as to be clamped between the inner side of the operating lever 3 and the other end 34b of the bell crank 34. Thus, the release element 17 and the link element 35 are prevented from falling off from the bell crank 34. For this reason, it is unnecessary to apply processing for prevention of falling-off to the forward ends of the respective release element and link element 17 and 35.

Further, the support shaft 11 is provided so to extend through the swing arm 7 and is connected to one end 13a of the cable mounting element 13 for angular movement. The other end 13b of the cable mounting element 13 is connected to the brake operating device through a control cable 12.

At brake operation, the operating lever 3 is first raised up from the break release condition as shown in FIG. 1. The operating lever 3 is moved angularly in the clockwise direction in FIG. 1 about the angularly movable shaft 6. The swing arm 7 is moved angularly in the clockwise direction through the support shaft 11 which is abutted against the one sides 16a of the respective openings 16 formed in the operating lever 3. The control cable 12 for operating the brake operating device by the cable mounting piece 13, which is supported on the support shaft 11, is pulled or tensioned to operate the brake. In the illustrated embodiment, when the operating lever 3 is moved angularly to a moving position 3' indicated by the two dot and dash lines in FIG. 2, the operating lever 3 is brought to the full-cock condition. The swing arm 7 is moved angularly to the braking position illustrated in FIG. 2, so that the brake is brought to the fully operating condition.

Figure 2:
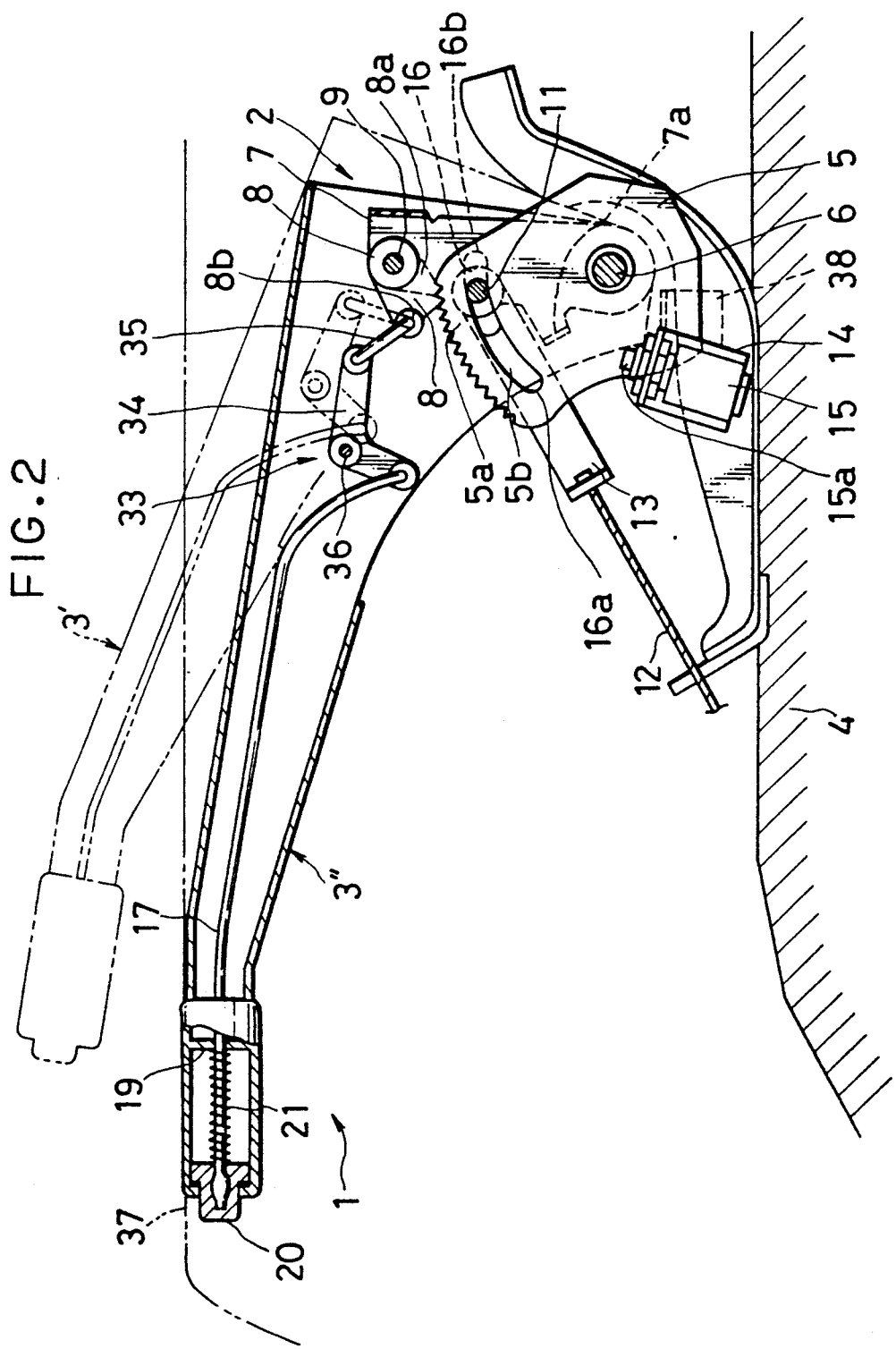
FIG. 2 is a cross-sectional side elevational view showing a full-cock condition at operation of the brake illustrated in FIG. 1 and showing a fixed-position condition at the brake operation.

The swing arm 7 is held on the bracket 5 by meshing between the ratchet pawl 8 and the ratchet 5a at the braking position illustrated in FIG. 2, so that it is ensured that the brake operating force is maintained.

The operating lever 3 moved angularly to the moving position 3' of the full-cock is supported by the angularly movable shaft 6 independently of the swing arm 7. By the relationship between the support shaft 11 provided on the swing arm 7 and the openings 16 provided in the operating lever 3, relative movement is permitted until the other sides 16b of the respective openings 16 are abutted against the right-hand side of the support shaft 11. Thus, when an operator releases his hands from the operating lever 3, the latter is moved angularly in the counterclockwise direction in FIG. 2 about the angularly movable shaft 6 under the own weight. The operating lever 3 is pushed back to a predetermined position 3" at the brake operation which is substantially in agreement with an upper face of a driver's seat 37 indicated by the two dot and dash lines. At this time, an angle defined between the ring element 35 and the bell crank 34 becomes larger slightly, so that the bell crank 34 is moved angularly slightly in the clockwise direction about the angularly movable shaft 36. However, since the angularly moving direction is the same as the biasing direction due to the spring 21, the forces acting upon the release element 17 and the link mechanism 33 due to the elasticity of the spring 21 do not prevent angular movement of the operating lever 3 in the counterclockwise direction.

In the illustrated embodiment, the peripheral length of each of the openings 16 about the angularly movable shaft 6 is set in correspondence with the angle of the operating lever 3 through which the operating lever 3 reaches the height of the upper face of the driver's seat 37 from the full-cock position 3' where the brake is fully operated, so that the operating lever 3 is prevented from protruding from the driver's seat 37 more than is necessary during the brake operation. Thus, getting-in and getting-out by the driver is made easy after operation of the parking brake, making it possible to prevent the space within the car from being reduced or narrowed. In this connection, a quantity of return of the operating lever 3 from the full-cock position 3' should not be limited, but may optionally be set in accordance with the arranging position of the parking-brake operating device 1 within the car, and the like. When the operating lever 3 is returned to the brake release position as shown in FIG. 1, however, discrimination will become difficult as to whether or not the brake is operated. Accordingly, it is desirable than an adequate quantity of return is set.

In the case where the brake is released, the operating lever 3 is gripped to push the release knob 20. The bell crank 34 connected to the forward end of the release element 17 is moved angularly in the counterclockwise direction. The ratchet pawl 8 is moved angularly in the clockwise direction by the link element 35 to move the meshing portion 8a away from the tooth faces of the ratchet 5a. Thus, the swing arm 7 is brought to an angularly movable condition. The swing arm 7 is moved angularly in the counterclockwise direction about the angularly movable shaft 6 by the restoring force of the brake which is transmitted from the control cable 12 through the support shaft 11. After the support shaft 11 has been abutted with a predetermined force against the one sides 16a of the respective openings 16 which are formed in the operating lever 3, the force of the hands gripping the operating lever 3 is loosened and the movement of the operating lever 3 follows, the swing arm 7 and the operating lever 3 are moved angularly together. The operating lever 3 is returned to its original position, and the swing arm 7 is also returned to its original position, so that the brake is fully released. Thus, the brake is brought to the release condition.

Under the condition that the operating lever 3 is returned to the position illustrated in FIG. 1, the one side 16a of the opening 16 formed in the operating lever 3 is pushed by the left-hand side of the support shaft 11, and the lower portion of the operating lever 3 is supported by a support piece 38 which is fixedly mounted to the bracket 5. Accordingly, it can be avoided that displacement occurs in the operating lever 3 due to vibration and the like during running, to generate noises.

In the embodiment, only in the case where the turning-back piece 7a formed such that a part of the swing arm 7 is bent or folded substantially perpendicularly pushes the actuator 15a of the brake detection switch 15 at the original position of the brake release, a brake warning lamp (not shown) arranged on an instrument panel is turned off. Accordingly, it is possible to discriminate the operating condition of the brake further easily.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A parking-brake operating device, comprising:
a braking-force holding mechanism including a plate-like bracket having a ratchet wheel and mounted at a location adjacent a seat on a body floor, a swing arm mounted to said bracket for angular movement, and a ratched pawl supported on said swing arm for angular movement to selectively engage with and disengage from said ratchet so as to hold said swing arm relative to said bracket;
an operating lever supported on said bracket coaxially with said swing arm and for angular movement, said operating lever having at least one opening;
a support shaft mounted on said swing arm and loosely fitted in said opening so as to permit a predetermined amount of relative movement between said swing arm and said operating lever;
a link mechanism including a bell crank supported on said operating lever for angular movement, and a link element having ends connected respectively to a first end of said bell crank and to said ratchet pawl for angular movement;
a release element mounted to said operating lever, said release element having one end connected to a release knob projecting from said operating lever, another end of said release element being connected to another end of said bell crank; and
a cable mounting element having one end thereof connected to said support shaft and another end connected to a brake control cable.

2. The parking-brake operating device according to claim 1, wherein said bracket is provided therein with at least one opening extending eccentrically with an angularly movable shaft for said swing arm and said operating lever, and wherein said support shaft provided on said swing arm extends through said opening in said bracket.

3. The parking-brake operating device according to claim 1, wherein said swing arm is provided with an urging section which pushes an actuator of a brake detection switch.

4. The parking-brake operating device according to claim 3, wherein said urging section is formed such that a part of said swing arm is folded.

5. The parking-brake operating device according to claim 1, wherein said opening in said operating lever is formed eccentrically with an angularly movable shaft of said operating lever.

6. The parking-brake operating device according to claim 1, wherein said bell crank is supported by a small diameter section of a stepped angularly movable shaft fixedly mounted to said operating lever, and wherein said bell crank has one side thereof which is axially positioned by an end face of a relatively larger diameter section of said stepped angularly movable shaft.

7. The parking-brake operating device according to claim 6, wherein said release element and said link element have their respective ends folded, and wherein said end of said release element and said end of said link element are involved in said bell crank in a direction from said small diameter section of said stepped angularly movable shaft toward said relatively larger diameter section thereof.

8. The parking-brake operating device according to claim 1, including a coil spring interposed between a support piece provided on said operating lever and said release knob.

9. The parking-brake operating device according to claim 1, including at least one spacer fitted in an angularly movable shaft between an outside of said swing arm and an inside of said operating lever.

* * * * *